United States Patent [19]

Smith et al.

[11] 4,142,416

[45] Mar. 6, 1979

[54] CARBOXYLIC ACID COMPOSITION FOR FORMING THERMOPARTICULATING COATING

[75] Inventors: James D. B. Smith, Wilkins Township, Allegheny County; David C. Phillips, Penn Hills Township, Allegheny County, both of Pa.

[73] Assignee: Westinghouse Electric Corp., Pittsburgh, Pa.

[21] Appl. No.: 854,944

[22] Filed: Nov. 25, 1977

Related U.S. Application Data

[63] Continuation of Ser. No. 690,442, May 27, 1976, abandoned.

[51] Int. Cl.² ............... G08B 21/00; G01K 11/00; G01K 1/02; C08L 67/08; C09K 1/00; C08K 5/09; C08L 63/02; C08L 63/00; C08L 67/00; C08L 67/02
[52] U.S. Cl. ............... 73/339 R; 23/230 R; 23/232 R; 23/232 E; 252/408; 260/31.2 XA; 260/31.4 EP; 260/31.8 E; 260/31.8 XA; 260/37 EP
[58] Field of Search ............... 252/408; 73/28, 339 R, 73/339 TP; 260/31.2 XA, 31.4 EP, 37 EP, 47 EP, 31.8 E, 31.8 XA; 20/230 R, 232 R

[56] References Cited

U.S. PATENT DOCUMENTS

| | | | |
|---|---|---|---|
| 2,759,901 | 8/1956 | Greenlee | 260/31.4 EP |
| 2,928,791 | 3/1960 | Loconti | 252/408 |
| 3,427,880 | 2/1969 | Grobel et al. | 73/339 R |
| 3,678,004 | 7/1972 | Meyers et al. | 260/31.4 EP |
| 3,807,218 | 4/1974 | Carson et al. | 73/28 |
| 3,845,662 | 11/1974 | Surgina et al. | 73/358 |
| 3,862,824 | 1/1975 | Chapman | 252/408 |
| 3,957,014 | 5/1976 | Phillips et al. | 116/114 F |
| 3,972,225 | 8/1976 | Fort et al. | 73/28 |
| 3,973,438 | 8/1976 | Smith et al. | 73/339 R |
| 3,973,439 | 8/1976 | Smith et al. | 73/339 R |
| 3,995,489 | 12/1976 | Smith et al. | 73/339 R |
| 4,080,535 | 3/1978 | Phillips et al. | 73/339 R |

*Primary Examiner*—Richard E. Schafer
*Assistant Examiner*—T. S. Gron
*Attorney, Agent, or Firm*—R. D. Fuerle

[57] ABSTRACT

A composition is disclosed of a carboxylic acid, a resinous carrier, and a solvent. The composition is applied to a portion of an electrical apparatus which is exposed to a gas stream. The solvent in the composition is evaporated to produce a thermoparticulating coating. When the electrical apparatus overheats the carboxylic acid in the coating forms particles in the gas stream which are detected by the monitor.

16 Claims, No Drawings

CARBOXYLIC ACID COMPOSITION FOR FORMING THERMOPARTICULATING COATING

This is a CONTINUATION of application Ser. No. 690,442 filed May 27, 1976, now abandoned.

CROSS-REFERENCES TO RELATED APPLICATIONS

This application is also related to application Ser. No. 390,284, filed Aug. 21, 1973, by J. D. B. Smith et al. entitled "Malonic Acid Composition for Thermoparticulating Coating," now U.S. Pat. No. 3,973,438.

This application is related to application Ser. No. 568,219, filed Apr. 15, 1975, by J. D. B. Smith and D. C. Phillips, entitled "Malonic Acid Derivative Composition For Forming Thermoparticulating Coating," now U.S. Pat. No. 3,995,489.

BACKGROUND OF THE INVENTION

Electrical apparatus, such as motors and turbine generators, occasionally overheat due to shorts or other malfunctions. The longer the overheating continues the more damage is done to the apparatus. A malfunction detected immediately may mean only a quick repair but if the overheating continues, the entire machine may be damaged.

Large rotating electrical apparatus is usually cooled with a hydrogen gas stream. The organic compounds in the apparatus are first to be affected by the overheating and they decompose to form particles which enter the gas stream. Monitors then detect particles in the gas stream and sound a warning or shut down the apparatus when too many particles are detected.

Descriptions of such monitors and how they function may be found in U.S. Pat. No. 3,427,880 entitled "Overheating Detector For Gas Cooled Electrical Machine" and in U.S. Pat. No. 3,573,460 entitled "Ion Chamber For Submicron Particles." Another monotor, "The Condensation Nuclei Detector," is described by F. W. VanLuik, Jr. and R. E. Rippere in an article entitled "Condensation Nuclei, A New Technique For Gas Analysis," in Analytical Chemistry 34,1617 (1962) and by G. F. Skala, in an article entitled "A New Instrument For The Continuous Detection Of Condensation Nuclei," in Analytical Chemistry 35, 702 (1963).

As U.S. Pat. Nos. 3,427,880 and 3,807,218 suggest, special coatings may be applied to the apparatus which decompose and form detectable particles at a lower temperature than the usual organic compounds found in the apparatus. For example, those patents mention polyalphamethylstyrene, polystyrene, polymethyl methacrylate, and cellulose propionate which decompose to form particles at 230° to 340° C. Unfortunately, since these machines normally operate at about 50° to 100° C., they may be severely damaged by the time the temperature reaches 230° to 340° C.

Efforts to identify materials which will decompose to form detectable particles (i.e., thermoparticulate) at temperatures closer to the operating temperature of the machine have met with several difficulties. Many compounds, such as maleic acid, fumaric acid, and polyacrylic acid, do not decompose below 190° C. Others such as acetic acid, are liquids which boil and therefore are unsuitable. Some compounds, such as oxalic acid, decompose at a low temperature but the decomposition products do not include detectable particles. Compounds such as 1.2-diformylhydrazine have some of the desirable properties but cannot withstand several years operation at 50° to 100° C. A few compounds contain toxic or corrosive substances in their decomposition products which may render them unsuitable.

SUMMARY OF THE INVENTION

We have found that certain carboxylic acid compounds can be used in a composition to form a thermoparticulating coating. The coating can be made compatible with the other organic compounds in the apparatus. The coating is very stable and can withstand several years operation at 60° or 80° C. (depending on the particular carboxylic acid used) without decomposing, yet still produce detectable particles when the temperature reaches about 130° to 196° C. (depending on the particular carboxylic acid used). Also, when the coating is heated to about the thermoparticulating temperature of the coating it blisters and becomes a very dark brown or black color which is a considerable aid in locating the malfunction.

The carboxylic acid compounds of this invention are inexpensive, non-toxic, and mix well with epoxy resins. Unlike the malonic acid compounds described in the hereinbefore cited cross-referenced applications, the carboxylic acid compounds of this invention seem to sublime rather than decompose at the thermoparticulating temperature. This is evidenced by the condensation of the original carboxylic acid after thermoparticulation.

DESCRIPTION OF THE INVENTION

A composition is prepared of a carboxylic acid in a solution of a resinous carrier. The carboxylic acid in a solution of a resinous carrier. The carboxylic acid may be dispersed if it is insoluble in the solvent (e.g., toluene) or it may be in solution if it is soluble in the solvent (e.g., ethyl alcohol or diethyl ether). Dispersions are preferred as they produce much more particulation than do solutions. A particle size of the dispersed carboxylic acid of about 25 to about 1000 microns is suitable.

The composition may be prepared by simply mixing the ingredients, but it is preferable to mix the drier, resinous carrier, and solvent first and then add the carboxylic acid to prevent the occlusion of the drier in the carboxylic acid and thereby obtain a more homogeneous dispersion of the carboxylic acid.

A suitable composition is a resinous carrier, about 20 to about 250 phr (parts by weight per hundred parts of resinous carrier) of carboxylic acid, and about 25 to about 75% (by weight based on the resinous carrier) of a solvent for the resinous carrier. If the amount of carboxylic acid is less than about 20 phr, the quantity of particles given off during decomposition may be too low to be detected by presently-existing detectors. However, the construction of more sensitive detectors would permit a lower amount of carboxylic acid. If the amount of carboxylic acid exceeds about 250 phr, the composition is thick, difficult to apply, and does not bond well. The preferred amount of carboxylic acid, which generally gives the best results, is about 40 to about 60 phr. If the amount of solvent is less than about 25%, the composition is generally too viscous to apply easily and if the amount of solvent is greater than about 75%, the composition is unnecessarily dilute and the coating may be too thin to produce an adequate number of particles during decomposition, at least while the malfunction is highly localized. Best results are usually obtained with about 45 to about 55% solvent.

The composition also preferably contains about 0.1 to about 3 phr of a drier when the resinous carrier is an epoxy resin or similar resin, to promote its room temperature cure. Lead naphthenate or cobalt naphthenate is preferred although stannous octoate, zinc stearate, etc. could also be used. Resins such as polyesters may also require the presence of an organic peroxide as is known in the art. Mixtures of various resins, solvents, or driers are also contemplated.

The thermoparticulating compounds of this invention are carboxylic acids which decompose between about 60° and about 200° C. and produce particles larger than about 25Å, the smallest particle size that can be detected with presently-existing monitors. Specifically, suitable carboxylic acid compounds have the general formula HOOCR, where R is

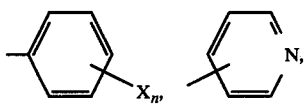

or —CHR"R'
where R' is alkyl to $C_{24}$ or carboxyalkyl to $C_{24}$, R" is H or OH, X is halogen, nitro, alkyl to $C_5$, carboxy, or amino, and n is 1 to 5. Preferably R is CHR"R' because these compounds give the strongest signals and the best aging. The R' group is preferably carboxyalkyl from $C_2$ to $C_{18}$ and R" is preferably H as those compounds give the best signals and have the best aging stability. The X group is preferably halogen or nitro and n is preferably 1 because these compounds are inexpensive, give good signals, and give good mass spectral "fingerprints." Mixtures of carboxylic acids are also contemplated. Examples of suitable carboxylic acids are given in the examples.

The resinous carrier performs the function of bonding the carboxylic acid to the apparatus since a coating of carboxylic acid by itself does not adhere well. The resinous carrier should be compatible with the other resins used in the apparatus and therefore it is usually advantageous to use the same resin used elsewhere. The resinous carrier is curable at 60° C. and is preferably air-dryable since it cannot be easily cured in place with heat. Also, it should be stable after curing for several years at 60° C. The resin must be substantially unreactive with the carboxylic acid for otherwise suitable thermoparticulation will not occur. The carboxylic acid and the resin form a mixture and the carboxylic acid does not catalyze the cure of the resin. Epoxy resins are preferred as they are usually used elsewhere in the apparatus, but polyesters, silicone rubber, polystyrene, etc. could also be used.

The solvent for the resinous carrier depends on the particular resinous carrier used. Toluene, xylene, benzene, methyl ethyl ketone, ethyl alcohol, diethyl ether, acetone, cellosolve, etc. are common solvents that may be used. Toluene is preferred as it is inexpensive and dissolves most resins.

The composition is applied to portions of the electrical apparatus which are exposed to the gas stream. The coating does not function as insulation and is usually applied on top of insulation, but it can also be applied to conductors. The application may be made by brushing, spraying, dipping, grease gun, troweling, or other techniques. A suitable coating thickness (after drying) is about 1/16 to about ½ inch. The dispersed particles of carboxylic acid should not be covered with excessive resinous carrier as that may prevent the decomposition particles from escaping into the gas stream. After evaporation of the solvent and room temperature cure of the resinous carrier, if necessary, the apparatus is ready to be operated. When thermoparticulation and the resulting alarm occur, a sample of the gas stream can be collected and analyzed. Since different carboxylic acids and other thermoparticulating compounds can be used in different areas of the apparatus and their thermoparticulation products are different, analysis of the sample can pinpoint the location of the overheating.

The compositions of this invention are useful in areas of generators which are not subject to temperatures much in excess of 60° or 80° C. (depending on the particular carboxylic used). Such areas include the outside surface of the stator windings at the exciter end of a 2-pole, gas-cooled machine with radial gas flow (i.e., at the "cool" end), the outside surface of the stator windings at the exciter end of a water-cooled, 4-pole machine with axial core ventilation, and on the cool end of the stator coil of a 4-pole, gas-cooled machine with axial core ventilation.

The following examples further illustrates this invention.

EXAMPLE 1

The following composition was prepared using various carboxylic acids:

|  | Parts by Weight |
| --- | --- |
| Carboxylic acid | 100 |
| Epoxy resin, 50% solids in toluene, made from 200 pbw (parts by weight) linseed fatty acids, 200 pbw styrene, and 300 pbw diglycidyl ether of Bisphenol A, sold by Westinghouse Electric Corporation as "B-276" Varnish (See Example I of U.S. Pat. No. 2,909,497 for detailed description) | 100 |
| 6% solution in low boiling hydrocarbons of cobalt naphthenate | 1.0 |
| 24% solution in low boiling hydrocarbons of lead naphthenate | 0.25 |

The cobalt and lead naphthenate solutions were added to the epoxy resin prior to the addition of the carboxylic acid.

Samples were prepared by brushing the above composition onto 3 inch by 1 inch aluminum sheets 1/16 to ¼ inches thick. The samples were dried overnight at 60° C. to form coatings ¼ inches thick, then placed in a forced-air oven at 60° or 80° C. for various periods to determine if they were stable and would function after aging.

The samples were placed one at a time in a stainless steel boat within a 1 inch o.d. stainless steel tube. Hydrogen was passed over the samples at flow rate of 6-l/min. A phase-controlled temperature regulator and programmer controlled the temperature in the boat and the temperature in the boat was measured by mounting a hot junction chromel-alumel thermocouple within a small hole in the boat. The output of the thermocouple and the detector were monitored on a two-pen potentiostatic recorder. A 6° C./min. heating rate was maintained in each experiment after the insertion of the sample in the boat. The "alarm" temperature at which considerable particulation occurred was taken from the chart; this corresponded to a 50% decrease in the initial ion current of the Generator Condition Monitor (usually 0.8 to 0.4 mA). The temperature where thermoparticulation began was also noted (i.e., the "threshold" temperature). These two temperatures enabled a "thermoparticulation temperature range" to be recorded for each sample (i.e., the organic particulation temperature range, OPTR). Some tests were performed on a condensation nuclei detector, which gives about the same results as the ion chamber detector.

The following table gives the results:

| Carboxylic Acid | Aging Conditions | Literature Melting Point or Decomposition Temperature (° C) | | OPTR (° C) |
|---|---|---|---|---|
| Oxalic Acid $(COOH)_2$ | 1 day at 60° C. | 202–212 | (mp) | >190* |
| Succinic Acid $(CH_2)_2(COOH)_2$ | 1 day at 60° C. | 187–190 | (mp) | 164–170 |
| Fumaric Acid HOOCCH=CHCOOH(trans) | 1 day at 80° C. | 299–300 | (mp) | >180** |
| Maleic Acid HOOCCH=CHCOOH(cis) | 1 day at 80° C. | 134–136 | (mp) | >180** |
| Glutaric Acid $(CH_2)_3(COOH)_2$ | 1 day at 60° C. | 95–98 | (mp) | 158–163 |
| Adipic Acid $(CH_2)_4(COOH)_2$ | 2 days at 60° C. | 152–153 | (mp) | 144–146 |
| Heptadecanoic Acid $CH_3(CH_2)_{15}COOH$ | 16 hours at 60° C. | 59–61 | (mp) | 140–144 |
| Tridecanoic Acid $CH_3(CH_2)_{11}COOH$ | 16 hours at 60° C. | 41–42 | (mp) | 140–142 |
| Lauric Acid $CH_3(CH_2)_{10}COOH$ | 16 hours at 60° C. | 43–45 | (mp) | 134–142 |
| Palmitic Acid $CH_3(CH_2)_{14}COOH$ | | 61–63 | (mp) | 147–151 |
| Stearic Acid $CH_3(CH_2)_{16}COOH$ | 2 days at 60° C. | 67–69 | (mp) | 140–142 |
| Pentric Acid (octric acid, 1,3,5-tricarboxy pentane) $\begin{array}{c} CH_2-CH_2-CH-CH_2-CH_2 \\ \mid \quad\quad \mid \quad\quad \mid \\ COOH \quad COOH \quad COOH \end{array}$ | 10 months at 80° C. | 116–119 | (mp) | 158–161 |
| Polyacrylic Acid $\left[\begin{array}{c} CH-CH_2 \\ \mid \\ COOH \end{array}\right]_n$ | 1 day at 80° C. | | | >190 |
| p-Chlorobenzoic Acid Cl—⌬—COOH | 1 day at 80° C. | 239–241 | (mp) | 157** |
| p-Nitrobenzoic Acid $NO_2$—⌬—COOH | 1 day at 80° C. | 239–241 | (mp) | 180** |
| Anthranilic Acid ⌬(COOH)(NH_2) | 3 days at 60° C. | 144–148 | (mp) | 172–179 |
| Cyanoacetic Acid C≡NCH_2COOH | 50 days at 60° C. | 65–67 | (mp) | >190 |
| Ethylene diamine tetra-acetic Acid $(HO_2CH_2)_2NCH_2CH_2N(CH_2CO_2H)_2$ | 3 days at 60° C. | 245 | (dec) | >190 |
| Ketomalonic Acid dihydrate $HOOCC(OH)_2COOH$ | 50 days at 60° C. | 118–120 | (dec) | >190 |
| L-Ascorbic Acid $CH_2OHCHOHCHCOH=COHCOO$ (ring) | 1 day at 80° C. | 190–193 | (dec) | >180** |
| Nicotinic Acid (pyridine-3-carboxylic acid) N⌬—COOH | 1 day at 60° C.<br>2 months at 60° C. | | | 167–172<br>173–177 |
| Benzoic Acid HOOC—⌬ | 1 day at 60° C. | | | >190 |
| Phthalic Acid ⌬(COOH)(COOH) ortho | 1 day at 60° C. | | | 160–165 |
| Isophthalic Acid ⌬(COOH)(COOH) meta | 1 day at 60° C. | | | 182–188 |

| Carboxylic Acid | Aging Conditions | Literature Melting Point or Decomposition Temperature (° C) | OPTR (° C) |
| --- | --- | --- | --- |
| o-Toluic Acid (CH₃, COOH on benzene) | 1 day at 60° C. | | 166–174 |
| m-Toluic Acid (CH₃, COOH on benzene) | 1 day at 60° C. | | 166–172 |
| p-Toluic Acid (CH₃—C₆H₄—COOH) | 1 day at 60° C. | | 166–171 |

*small signal at 137° C, but not sufficient to decrease the ion current by 50%.
**test performed on Condensation Nuclei Detector.

The above table shows that oxalic acid, fumaric acid, maleic acid, polyacrylic acid, cyanoacetic acid, benzoic acid, ketomalonic acid dihydrate, and L-ascorbic acid were not suitable. Succinic acid was previously found to be unsuitable when tested on a condensation nuclei monitor because no signal was received, but a signal is received on an ion chamber monitor.

All of the carboxylic acid compounds of this invention may be collected condensed in their original state after thermoparticulation.

EXAMPLE 2

A composition containing 1,3,5-tricarboxypentane prepared as in Example 1 was brushed onto copper rectangular blocks (4 × 2¼ × 1½ inches). The coating was allowed to dry overnight at 60° to 80° C.; total coating build was approximately 10 mils over an area of 31 square inches (end plates not covered).

The block contained two 650 watt heaters drilled into the copper core; the heaters were connected in parallel (two exit leads). The copper block was also equipped with two thermocouples. The block was connected to separate inspection plates in a large generator (four sides of block in hydrogen flow); each block being approximately ½ inch from the outer surface of the generator. The generator was 112 inches in diameter by 245 inches long, 2-poles, 26 kV (980 MVA).

In the tests, the coated blocks were externally heated by a source of electrical power. The rate of rise of temperature was controlled by 5° C./minute and the hydrogen was monitored for particulate matter by means of an Environment One Generator Condition Monitor.

The following table gives the results:

| Monitor Alarm Temperature | Time of Run | Monitor Flow (meter) reading | Pressure | Speed | Gas Temperature |
| --- | --- | --- | --- | --- | --- |
| 155 to 165° C. | 30 min. | 11.0 | 30 psi | 3600 rpm | 31° C. |

We claim:

1. A room temperature, air-dryable coating composition comprising at least one thermoparticulating carboxylic acid and a solution in an organic solvent of a room temperature, air-dryable polyester or epoxy resinous carrier which is and substantially unreactive with said carboxylic acid and stable when cured, said carboxylic acid having the general formula HOOCR, where R is

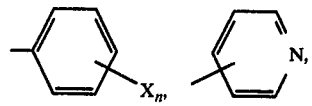

or —CHR"R'
where R' is alkyl to $C_{24}$ or carboxyalkyl to $C_{24}$, R" is H or OH, and where each X is independently selected from the group consisting of halogen, nitro, alkyl to $C_5$, carboxy, and amino, and n is 1 to 5 wherein the amount of said carboxylic acid is about 20 to about 250 phr and the amount of the solvent in said solution is about 25 to about 75% (by weight based on said resinous carrier).

2. A composition according to claim 1 wherein R is CHR"R'.

3. A composition according to claim 2 wherein R' is carboxyalkyl from $C_2$ to $C_{18}$ and R" is hydrogen.

4. A composition according to claim 1 wherein X is halogen, nitro, or a mixture thereof, and n is 1.

5. A composition according to claim 1 wherein the amount of said carboxylic acid is about 40 to about 60 phr and the amount of said solvent is about 45 to about 55% (by weight based on said resinous carrier).

6. A composition according to claim 1 wherein said resinous carrier is an epoxy resin.

7. A composition according to claim 6 which includes about 0.1 to about 3 phr of a drier for said epoxy resin.

8. A composition according to claim 7 which is prepared by first mixing said solution of resinous carrier and said drier and then mixing in said carboxylic acid.

9. A composition according to claim 1 wherein the solvent in said solution is toluene.

10. A composition according to claim 1 wherein said carboxylic acid is dispersed in said solution.

11. A method of protecting electrical apparatus from damage due to overheating and for thereafter determining the location of said overheating, said apparatus including a gas stream and a monitor for detecting particles in said gas stream and for emitting a signal when said particles are detected comprising:
(A) preparing a composition according to claim 1;
(B) applying said composition to said electrical apparatus at positions exposed to said gas stream;
(C) evaporating said solvent; and (D) monitoring said gas stream for the presence of particles therein.

12. A method according to claim 11 including the additional last step of inspecting said apparatus visually for blistered and darkened areas, after a signal has been emitted, to locate the area of overheating.

13. A method according to claim 12 including the additional last steps of collecting a sample of said gas stream after a signal has been emitted, and analyzing said sample.

14. A thermoparticulating coating comprising a solid layer of room temperature, air-dried polyester or epoxy resinous carrier containing about 20 to about 250 phr of a thermoparticulating carboxylic acid having the general formula HOOCR, where R is

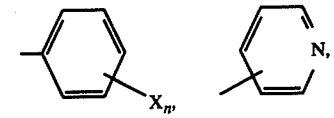

or —CHR"R'
where R' is alkyl to $C_{24}$ or carboxyalkyl to $C_{24}$, R" is H or OH, and where X is independently selected from the group consisting of halogen, nitro, alkyl to $C_5$, carboxy, and amino, and n is 1 to 5.

15. A coating according to claim 14 which is about 1/16 to about ½ inches thick.

16. A thermal detection system for electrical apparatus cooled by a gas stream comprising a coating according to claim 14 on a portion of said electrical apparatus exposed to said gas stream and a monitor for detecting the presence of particles in said gas stream.

* * * * *